United States Patent [19]

Kavanagh

[11] Patent Number: 4,731,024
[45] Date of Patent: Mar. 15, 1988

[54] CHILDREN'S AMUSEMENT CENTER

[76] Inventor: Hilary F. Kavanagh, 6677 Fairfax Rd., Chevy Chase, Md. 20815

[21] Appl. No.: 39,266

[22] Filed: Apr. 17, 1987

[51] Int. Cl.$^4$ .............................................. G09B 19/24
[52] U.S. Cl. ................................................... 434/260
[58] Field of Search ........................................ 434/260

[56] References Cited

U.S. PATENT DOCUMENTS

| | | |
|---|---|---|
| D. 187,218 | 2/1960 | McHugh . |
| 2,416,959 | 3/1947 | Segal . |
| 3,538,620 | 11/1970 | Kohner et al. . |
| 3,568,357 | 3/1971 | Lebensfeld . |
| 4,471,957 | 9/1984 | Engalitcheff, Jr. .................. 434/260 |

Primary Examiner—Gregory E. McNeill
Attorney, Agent, or Firm—Henderson & Sturm

[57] ABSTRACT

An amusement apparatus (10) for children comprising: a housing unit (11); simulated (12) reduced size (13) and actual size (14) components adapted to be connected to the housing unit (11) wherein the components (12)(13)(14) are representative of common objects found in many households; and, an electrical circuit means (15) connected to selected components, and provided with an electrical battery (80) and switch elements (70) to activate the selected components; whereby a child will learn to safely operate the common objects upon which the components (12)(13) and (14) are based.

12 Claims, 3 Drawing Figures

U.S. Patent  Mar. 15, 1988  4,731,024
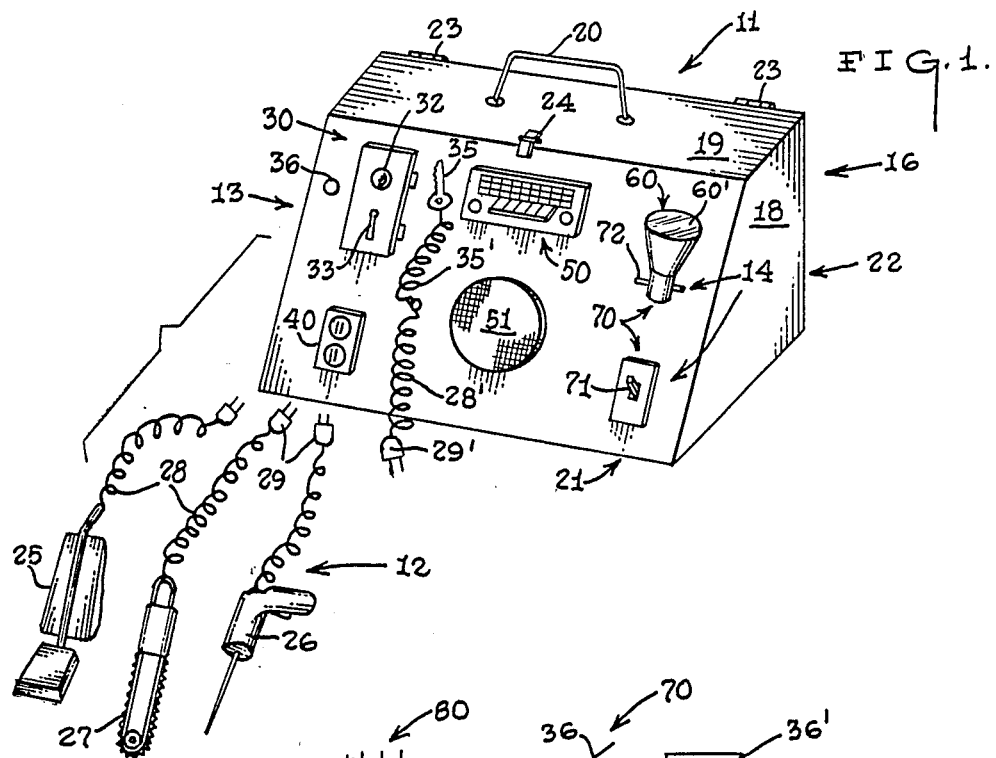
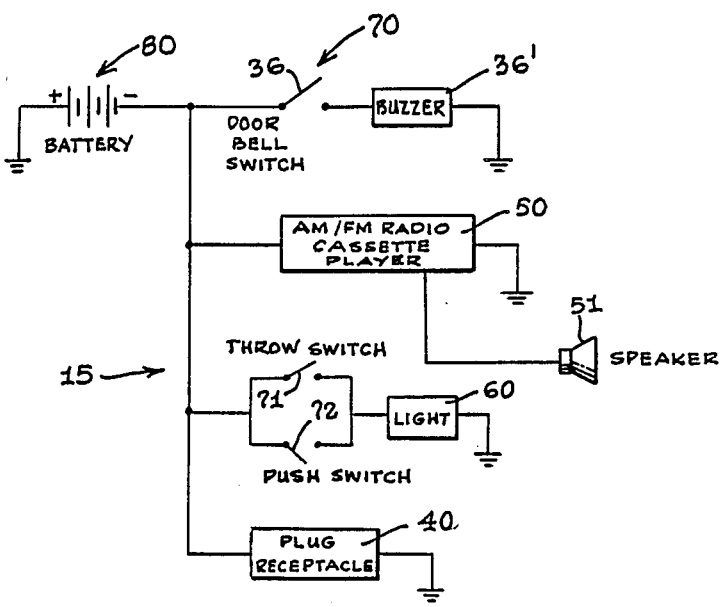
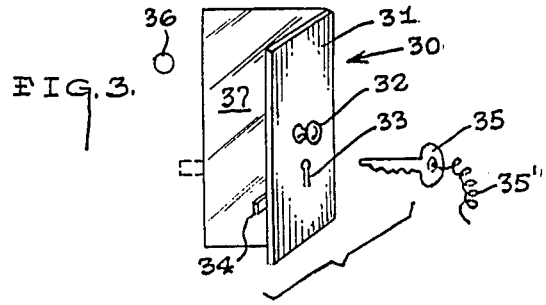

CHILDREN'S AMUSEMENT CENTER

TECHNICAL FIELD

The present invention relates to combined educational and amusement apparatus for children, wherein the child both learns and is entertained by use of the device.

BACKGROUND OF THE INVENTION

This invention was the subject matter of Disclosure Document Program Regisration No. 159556 filed in the U.S. Patent and Trademark Office on Nov. 19, 1986.

As all parents are well aware, two of the most vexing problems associated with child care involve: the constant need to provide a stimulating environment for the child; and, also the need to supervise the child's activities such that the child will not play with common household articles that are not toys, and which at best have the potential to cause annoyance to the parents, and at worst have the potential to inflict serious if not lethal bodily harm to the child.

It is widely accepted that all children try to emulate their parent's actions as part of their natural development. This mimicing pattern unfortunately does not end with the copying of inflections of speech and other physical mannerisms; but, extends to other areas wherein the child feels compelled to at least attempt to duplicate tasks and operate household implements that he observes his parents handling in a routine manner.

While the basic operation of most household implements is initially far beyond the capabilities of the vast majority of children; and, even those children who are adept enough to operate these implements do not have the necessary degree of wisdom, experience or common sense to do so wisely and safely.

Eventually children will learn how to properly handle these diverse implements and appliances through continued exposure and trial and error manipulation of the actuating mechanisms. However, until such time as they become proficient or adept at operating these devices, both the child and the device remain at risk.

While most children's amusement apparatus are intended to both educate and amuse a child, they also function to distract a child's attention away from the potentially hazardous items commonly found in a typical household such as electrical outlets, light switches or free standing lamps and the like. In practice; however, this distraction is temporary at best, and a child's curiosity will ultimately cause him to investigate and experiment at his risk. Examples of some of the aforementioned children's amusement apparatus may be seen by reference to the following U.S. Pat. Nos.: 3,568,357; 2,416,959; 3,538,620; and U.S. Pat. No. Des. 187,218.

While the foregoing patented structures are more than adequate for their limited purposes, they are also deficient in a number of respects in that: while they employ simumlation of some articles, implements, and objects that the child will use on an everyday basis as he grows older; they do not present a realistic environment wherein a child can actually learn the basic and safe methods emmployed in the operation of a wide variety of these objects using scaled down versions and actual components of the objects in question. Obviously there has been a long felt need for a children's amusement apparatus that not only provided entertainment for the child; but, also provided a safe and practical means to allow the child to experiment and learn about the workings and proper operations of everyday objects.

SUMMARY OF THE INVENTION

The present invention involves a children's amusement apparatus which comprises in general: a housing unit; simulated, reduced size, and actual components of common objects found in most households; an electrical circuit operatively connected to selected ones of said common objects and provided with switch means to electrically connect the selected common objects to a power source; and, a battery that provides a safe power source for the apparatus.

All of the simulated, reduced size, and actual components of the apparatus are operatively disposed on the housing unit; such that the child may operate and/or manipulate a plurality of the components simultaneously, and he has mastered the basic principles that govern the operation of the full scale objects that are represented on the apparatus.

In addition, this apparatus will allow the child to mimic his parents daily behavioral patterns in a safe manner, while presumably satisfying the child's curiosity regarding the proper operation of the full scale objects, to the extent that the child will not attempt the operation of those full scale objects when not under direct parental supervision.

Furthermore, this apparatus will accelerate the child's understanding of how various household objects operate, will teach the child the proper procedure for handling these objects, and will allow the child to be amused and entertained as he becomes familiar with the lessons that are to be learned by use of this apparatus.

BRIEF DESCRIPTION OF THE DRAWINGS

These and other objects, advantages and novel features of the invention will become apparaent from the detailed description of the best mode for carrying out the preferred embodiment of this invention which follows; particularly when considered in conjunction with the accompanying drawings, wherein:

FIG. 1 is a perspective view of the children's amusement apparatus of this invention;

FIG. 2 is a schematic wiring diagram of the circuitry employed in the apparatus; and, FIG. 3 is an enlarged detail view of one of the reduced size components of the invention.

BEST MODE FOR CARRYING OUT THE INVENTION

As can be seen by reference to the drawings, and in particular to FIG. 1, the children's amusement apparatus that forms the basis of the present invention is designated generally by the reference numeral (10). The amusement apparatus (10) comprises in general: a housing unit (11); simulated (12) reduced size (13); and actual size (14) components adapted to be connected to the housing unit (11); wherein, the components are representative of common objects found in many households; and an electrical circuit means (15) operatively connected to selected components. All of these features will now be described in seriatim fashion.

As shown in FIG. 1, the housing unit (11) comprises a generally rectangular housing member (16) having an angled face panel (17), generally trapezoidal side panels (18) and a lid panel (19) having a handle element (20). In addition, the housing unit may optionally be provided with a floor panel (21), a rear panel (22), and a hinge

(23) and clasp means (24) for pivotally securing the lid panel (19) to the housing unit (11) in a well recognized fashion.

As can also be seen by reference to FIG. 1, the simulated components (11) contemplated for use with this invention comprise a toy vacuum cleaner (25), a toy power drill (26) and a toy power saw (27) or the like having cord (28) and plug (29) elements attached thereto.

As can be seen by reference to FIGS. 1 and 3, the primary reduced size components (13) contemplated for use with the apparatus (10) comprises a miniature front door assembly (30) disposed on the face (17) of the housing unit (11) comprising a hinged door member (31) having a door knob element (32) a keyhold element (33), and a door lock element (34). In addition, the door assembly (30) is further provided with a key member (35) that is adapted to cooperate with the keyhold element (33) and the door lock element (34); a door bell member (36) that is disposed adjacent the door member (31); and, a mirror element (37) that is positioned behind the door member (31) on the face (17) of the apparatus (10).

Still referring to FIG. 1, it can be seen that the actual size components (14) contemplated for use with the apparatus (10) comprise an electrical plug receptacle (40) a radio/cassette member (50) having a remote speaker (51) a light element (60) and a plurality of electrical switch elements (70).

The interior of the housing unit (11) is provided with an electrical circuit means (15) that is operatively associated with selected ones of the components (12) (13) and (14) of the apparatus (10). As can be seen by reference to FIG. 2, the circuit means (15) is provided with a self-contained power source in the form of a sealed battery (80); and, the circuit means (15) is operatively connected to the door bell member (36), the radio cassette member (50) and the light element (60) thru a plurality of electrical switch elements (70). The electrical switch elements (70) comprise at least one throw switch (71) as would be employed on a wall mounted light switch (71); and, at least one push switch (72) as would be employed on a lamp.

In the preferred embodiment of this invention, the operation of the radio/cassette player (50) is governed by standard control knobs in a well recognized manner; and, in the embodiment of this invention wherein the plug receptacle member (40) is intended to be a live receptacle, the plug elements (29) will be electrically conductive.

Turning once more to FIG. 1, it can be seen that the apparatus (10) is further provided with an elongated tether element (35') that is secured on one end to the face (17) of the housing unit (11) and secured on the other end to the key member (35); whereby the tether element (35') will prevent the key element (35) from being misplaced by the child, as would invariably happen in the absence of such a provision. In addition, the housing unit (11) is also provided with a non-conductive cord (28') and plug (29') elements; wherein, the cord (28') is also secured on one end to the face (17) of the housing unit (11) and has a sufficient length to allow the non-conductive plug (29') to be inserted into the receptacle member (40).

In the proposed usage of the apparatus (10), the child would be instructed in the proper handling of the non-conductive cord (28') and plug (29') elements prior to being allowed to connect the simulated components (12) such as the vacuum cleaner (25), the power drill (26) or the power saw (27) to the apparatus (10). At this juncture it should be apparent that this invention contemplates the use of both: non-moving simulated components (12) which are not electrically connected to the circuit means (15) of the apparatus; as well s vibrating electro-mechanical simulated components (12) whose operation is dependent upon the cord (28) and plug (29) elements being electrically conductive.

This invention also contemplates that the vibrating simulated components (12) may be controlled either by their own independent switch means (not shown), or in conjunction with one of the electrical switch elements (70) on the housing unit (11).

It should also be noted that while the vibrating simulated components (12) will be capable of movement, they will only vibrate, and will not be capable of inflicting injury to the child's person. Along those same lines, the light element (60) is designed such that the light bulb (not shown) is contained within a sealed housing (60') such that the child cannot come into direct physical contact with the fragile bulb surface.

In addition to the foregoing, it should further be noted that the housing unit (11) is designed such that the housing member (16) will serve as a storage container for the simulated components (12) of the apparatus (10) as well as other small toys belonging to the child.

Having thereby described the subject matter of this invention it should be obvious that many substitutions, modifications, and variations of the invention are possible in light of the above teachings. It is therefore to be understood that the invention as taught and described herein, is only to be limited to the extent of the breadth and scope of the appended claims.

I claim:

1. An amusement apparatus for children; wherein, the apparatus comprises:
   a housing unit;
   simulated, reduced size, and actual size components adapted to connected to said housing unit; wherein, the components are representative of common objects found in many households; and,
   an electrical circuit means operatively connected to selected ones of said components, and having a battery and electrical switch elements to electrically activate the selected components.

2. The apparatus as in claim 1; wherein, the simulated components include: a toy vacuum; a toy power drill; and, a toy power saw.

3. The apparatus as in claim 2; wherein, the simulated components are provided with cord and plug elements.

4. The apparatus as in claim 3; wherein, the cord and plug elements are electrically conductive and adapted to be operatively connected to said electrical circuit means.

5. The apparatus as in claim 1; wherein, the reduced size component comprises a miniature front door assembly operatively connected to said housing unit.

6. The apparatus as in claim 5; wherein, the front door assembly comprises: a hinged door member having a door knob element and a keyhold element.

7. The apparatus as in claim 6; wherein, the front door assembly further comprises: a door bell member disposed on the housing unit adjacent to the said door member; and, a key member operatively associated with said keyhold element.

8. The apparatus as in claim 1; wherein, the actual size components include: an electrical plug receptacle; a light element; and, a plurality of electrical switch elements.

9. The apparatus as in claim 8; wherein, the actual size components further include: a radio/cassette member.

10. The apparatus as in claim 8; wherein, the electrical switch elements comprise at least one throw switch; and, at least one push switch.

11. The apparatus as in claim 7; wherein, the front door assembly also includes a mirror element attached to the housing unit and disposed behind the said door member.

12. The apparatus as in claim 10; wherein, said at least one throw switch and said at least one push switch, are operatively connected to the light element.

* * * * *